(12) United States Patent
Lau et al.

(10) Patent No.: US 9,075,962 B1
(45) Date of Patent: Jul. 7, 2015

(54) SECURE VIDEO DELIVERY

(71) Applicants: Raymond Lau, Charlestown, MA (US);
R. Paul Johnson, Burlington, MA (US)

(72) Inventors: Raymond Lau, Charlestown, MA (US);
R. Paul Johnson, Burlington, MA (US)

(73) Assignee: Ramp Holdings, Inc., Boston, MA (US)

(*) Notice: Subject to any disclaimer, the term of this patent is extended or adjusted under 35 U.S.C. 154(b) by 0 days.

(21) Appl. No.: 14/177,312

(22) Filed: Feb. 11, 2014

(51) Int. Cl.
*H04L 29/06* (2006.01)
*G06F 21/10* (2013.01)
*H04L 9/32* (2006.01)

(52) U.S. Cl.
CPC .............. *G06F 21/10* (2013.01); *H04L 63/164* (2013.01); *H04L 65/60* (2013.01); *H04L 9/3247* (2013.01); *H04L 9/3252* (2013.01); *H04L 9/3249* (2013.01); *H04L 9/3242* (2013.01); *G06F 2221/07* (2013.01)

(58) Field of Classification Search
CPC ................... H04L 2209/603; H04L 2463/101; H04L 65/60
USPC ......................................................... 713/178
See application file for complete search history.

(56) References Cited

U.S. PATENT DOCUMENTS

| 2011/0173345 A1* | 7/2011 | Knox et al. .................... 709/246 |
| 2013/0166906 A1* | 6/2013 | Swaminathan et al. ...... 713/155 |
| 2014/0230003 A1* | 8/2014 | Ma et al. ........................ 725/115 |

* cited by examiner

*Primary Examiner* — Jason K Gee
(74) *Attorney, Agent, or Firm* — Chapin IP Law, LLC

(57) ABSTRACT

Methods and apparatus, including computer program products, for secure video delivery. A method includes providing a cryptographically signed manifest Uniform Resource Locator (URL) to the Hypertext Transfer Protocol (HTTP) manifest format player, the signed URL including at least a validity time span and an identification of a video, in the manifest format player, loading the manifest URL, the manifest URL pointing to an instantiation of a proxy, in the proxy, loading the manifest URL and verifying a validity of the signed URL, in the proxy, retrieving the manifest URL contents, in the proxy, substituting each non-metadata entry in the manifest URL contents with signed URLs either to an underlying video segment or back to an instantiation of the proxy if an entry another manifest, and in the HTTP manifest player, processing the manifest altered with signed URLs as a standard manifest, playing the content.

9 Claims, 2 Drawing Sheets

---

200

Provide a cryptographically signed Uniform Resource Locator (URL) to a
Hypertext Transfer Protocol (HTTP) manifest format player
210

↓

Load the manifest URL
220

↓

Proxy receives the load request
230

↓

Proxy verifies the validity of the signed URL
240

↓

Proxy retrieves the manifest contents
250

↓

Proxy substitutes each non-metadata entry in the manifest with signed URLs
260

↓

HTTP manifest format player processes the manifest altered with signed URLs
270

↓

HTTP manifest format player plays the contents
280

100

200

Provide a cryptographically signed Uniform Resource Locator (URL) to a Hypertext Transfer Protocol (HTTP) manifest format player
210

▼

Load the manifest URL
220

▼

Proxy receives the load request
230

▼

Proxy verifies the validity of the signed URL
240

▼

Proxy retrieves the manifest contents
250

▼

Proxy substitutes each non-metadata entry in the manifest with signed URLs
260

▼

HTTP manifest format player processes the manifest altered with signed URLs
270

▼

HTTP manifest format player plays the contents
280

FIG. 2

SECURE VIDEO DELIVERY

BACKGROUND OF THE INVENTION

The invention generally relates computer systems and computer executed methods, and more specifically to secure video delivery.

In general, companies wish to protect enterprise video content from unauthorized viewers. In the past, this protection has been provided by a variety of techniques. For example, one technique is for a company to use a secure network. However, many companies are not experts in video and do not want to provision a secure infrastructure. Some of these companies find it more convenient to turn to an Internet cloud-based solution.

Other companies employ Digital Rights Management (DRM) solutions. However, DRM solutions are bound to a proprietary video player and platform, which may create difficulty in using widely available Internet infrastructures such as, for example, content deliver networks (CDNs). In addition, DRM solutions may introduce compatibility issues across devices that may not support the platform, such as the unavailability of Adobe® Flash, and limit the ability for video player customization.

What is needed is an ability to deliver video securely while using widely deployed commodity Internet infrastructure(s) with maximal compatibility across web browsers, devices, operating systems, enterprise network configurations and so forth.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for secure video delivery.

The present invention provides an ability to deliver video securely while using widely deployed commodity Internet infrastructure(s) with maximal compatibility across web browsers, devices, operating systems, enterprise network configurations and so forth.

In general, in one aspect, the invention features a method including, in a network including at least a server and a manifest format player, providing a cryptographically signed manifest Uniform Resource Locator (URL) for the Hypertext Transfer Protocol (HTTP) manifest format player to play, the signed URL including at least a validity time span and an identification of a video, in the manifest format player, loading the manifest URL, the manifest URL pointing to an instantiation of a proxy, in the proxy, receiving the manifest URL and verifying the validity of the signed URL, in the proxy, retrieving the manifest indicated by the manifest URL, the manifest comprising entries, in the proxy, substituting each relevant entry in the manifest URL contents with signed URLs either to an underlying video segment or back to an instantiation of the proxy if the entry were another manifest, in the HTTP manifest player, processing the manifest altered with signed URLs as a standard manifest, playing the content.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 2 is flow diagram of a secure video delivery process.

DETAILED DESCRIPTION

Figure 1:
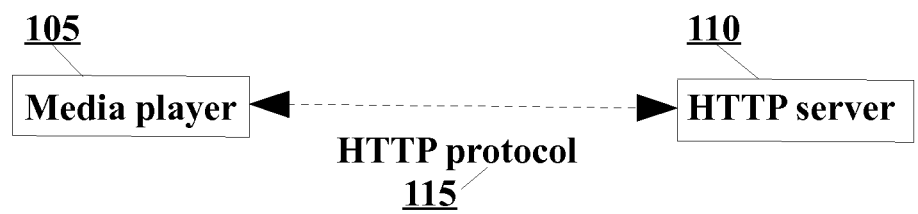
FIG. 1 is block diagram of an exemplary HTTP live streaming system.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

FIG. 1 illustrates an example of a system 100 for hypertext transfer protocol (HTTP) live streaming.

In general, streaming, which involves replaying content while a client is downloading it from a server, is distinguished from a simple file transfer, which involves first receiving an entire video content from a server and replaying the video afterwards. The client replays the content while receiving packets from the server, and then deletes the replayed data.

Examples of protocols for streaming files include the Hypertext Transfer Protocol (HTTP), File Transfer Protocol (FTP), Real-time Transport Protocol (RTP), Real Time Streaming Protocol (RTSP), HTTP Live Streaming (HLS), and so forth. Here, HTTP and FTP are essentially file transfer protocols, while RTP and RTSP are protocols for real-time file streaming. However, streaming protocols may be a layer built on top of file transfer protocols. In addition, HTTP includes HTTPS (i.e., TLS and SSL) and HLS is not restricted to live content.

Among the protocols above, HLS supports high security by employing an actual streaming method, instead of a more conventional progressive download method, to prevent illegal copying of contents and by using, for example, the AES-128 data encryption technique to prevent unauthorized replaying.

As shown in FIG. 1, the exemplary HTTP live streaming system 100 includes an HTTP server 105 and a media player 110. The system 100 uses HTTP 115 as a communication protocol. In this example, all of the media files are located in the HTTP server 105 with reference to a folder of the HTTP server 105. The media player 110 queries the media files located at the HTTP server 105 using HTTP protocol. Each media file can be divided into at least two parts, i.e., a playlist file and multiple media sequence files. The playlist file contains the locations and names of media sequence files and other metadata.

To play a media, the media player 110 first loads a playlist file and retrieves a location and details of media sequence files from the playlist file. The media player 110 then requests or queries individual media sequence files separately and renders them, for example, to a screen of the media player 110. The media player 110 reloads the playlist file to discover additional segments.

A playlist file is stored in a M3U format. The following is simple media playlist file in M3U format.
EXTM3U
EXT-X-VERSION:3
EXT-X-TARGETDURATION:5220
EXTINF:5219.2,
http://media.example.com/entire.ts
EXT-X-ENDLIST The following is an example of a Live Media Playlist in M3U format, using HTTPS.
EXTM3U
EXT-X-VERSION:3
EXT-X-TARGETDURATION:8
EXT-X-MEDIA-SEQUENCE:2680
EXTINF:7.975,
https://priv.example.com/fileSequence2680.ts
EXTINF:7.941,
https://priv.example.com/fileSequence2681.ts
EXTINF:7.975,
https://priv.example.com/fileSequence2682.ts An M3U Playlist, such as the ones shown above, is a text file that includes lines. Lines are terminated by either a single LF character or a CR character followed by an LF character. Each line is a Uniform Resource Identifier (URI), blank, or starts with the character "#". A URI line identifies a media segment or a Playlist file. Each media segment is specified by a media URI and the tags that apply to it.

A playlist is known as a media playlist if all URI lines in the playlist identify media segments. A playlist is known as a master playlist if all URI lines in the playlist identify media playlists. Lines that start with the character "#" are either comments or tags. Tags begin with #EXT. All other lines that begin with "#" are comments.

A URI in a playlist, whether it is a URI line or part of a tag, may be relative. Relative URIs must be resolved against the URI of the playlist file that contains it.

A duration of a media playlist file is the sum of the durations of the media segments within it.

HLS being HTTP-based provides for easy use of widely available Internet infrastructure. By using small segments, a streaming experience is maintained because to jump to another location in a segment only requires reading the segments starting from that location—as no segment is more than a nominal duration (e.g., 10 seconds), not much time is wasted in reading unnecessary data. By using a playlist manifest, additional features such as multiple variants to support adaptive bit rate (higher quality over high bandwidth connections) are supported. All of these benefits are available without the need for proprietary infrastructure.

HLS itself has a secure streaming option, but using that option requires more specialized infrastructure, e.g., the installation of corresponding supporting modules at each server serving the content. While many content delivery networks are increasingly supporting this option, one loses the benefit of ubiquitous commodity infrastructure that is available for plain HTTP(s), e.g., easy migration from one content delivery network to another, lower costs, and so forth.

The present invention provides an ability to deliver video securely while using widely deployed commodity Internet infrastructure(s) with maximal compatibility across web browsers, devices, operating systems, enterprise network configurations and so forth.

As used herein, the terms "playlist manifest," "playlist," and "manifest" are interchangeable and refer to a data structure that lists either video segments, other manifests, or both. There may also be additional metadata in such manifests.

A player, such as media player 110, generally refers to software that plays digital media. As used herein, a "player" may refer to a standalone player, as shown in FIG. 1, or a player embedded within a browser, an operating system or a device.

By way of example, the present invention is described in the context of HLS. However, methods described herein may be adapted to include other similar formats, such as Adobe® HTTP Dynamic Streaming (HDS), which generally uses the delivery of manifest files and video segments over HTTP(s). Though some of these formats are typically described in terms of live streaming, they typically support both live streaming and on-demand streaming. Methods of the present invention encompass both.

More specifically, the present invention may be adapted to any implementation of a video player supporting such files as an HTTP Manifest Format player, HTTP Manifest Player, HLS player, M3U8 player and the like. As described herein, discussion of HTTP, HTTPS, HTTP(s) is generally intended to cover both HTTP and HTTPS possibilities. HTTPS may refer to any version of HTTP with Transport Layer Security (TLS) or Secure Sockets Layer (SSL).

Lastly, though this detailed description uses video as an example, methods described herein may be adapted to audio multimedia delivery.

The present invention converts the URLs used to identify a playlist manifest as well as the segments into secure encrypted URLs. This permits continued operation on widely deployed commodity Internet infrastructure(s) and compatibility with existing players (which are available on a wide variety of browsers, devices, operating systems, and so forth) supporting HTTP playlist manifest-like protocols. The present invention focuses on two aspects. A first aspect is that the URLs need to be time-limited. This limits how long a URL will continue to function in the event that a compromised authorized user sends a URL to an unauthorized recipient.

A second aspect is that the URL by itself, which is easy to copy and paste, is tied to an identifying element of the browser or device on which it is valid, thwarting unauthorized casual copy and paste compromises.

A goal of the present invention is not to address a highly motivated authorized user, but a compromised user. For example, a user can always use a video camera to record the video as it is being played and send that recording to an unauthorized recipient. The goal herein is primarily to thwart casual sharing of videos with unauthorized recipients.

As shown in FIG. 2, an exemplary secure video delivery process 200 includes providing (210) a cryptographically signed Uniform Resource Locator (URL) to a Hypertext Transfer Protocol (HTTP) manifest format player. The signed URL includes at least a validity time span and an identification of a video.

In embodiments, the signed URL may use a Digital Signature Algorithm (DSA), a Rivest-Shamir-Adleman (RSA) algorithm, a hash message authentication code (HMAC), and so forth.

The HTTP Manifest Format Player loads (220) the manifest URL, which points to an instantiation of a proxy. The actual implementation of the proxy may include multiple instances performing the proxy functions. Thus, it is not intended that process 200 be restricted to a single running instance.

The proxy receives (230) the load request and verifies (240) the validity of the signed URL.

The proxy retrieves (250) the manifest contents. A manifest format may be HTTP Live Streaming (HLS).

The proxy substitutes (260) each non-metadata entry in the manifest with signed URLs, either to the underlying video segment or back to an instantiation of the proxy if that entry were in turn another manifest.

The HTTP manifest format player processes (270) the manifest altered with signed URLs as it would a standard manifest, playing (280) the video.

One drawback of process 200 is that the validity time span must be as long as the duration of the video, for when the user gets to the end of the video, the signed URLs that the player will be accessing must remain valid.

Given that short time validities increase security, as a signed URL passed to an unauthorized recipient would expire sooner, we would like to improve upon this limitation, especially when one hour or longer videos are involved.

We assume that the steps of providing (210) and loading (220) happen within a very short time span. However, the step of playing (280) of the contents may be over a longer time span. This enables use of a relatively short duration for the initial signed URL in the step of providing (210), but have longer validity time spans in the step of substituting (260). The longer time span can either be calculated by the proxy depending on the length of the video or can be explicitly requested as part of the signed parameters in the step of providing (210).

One approach to shortening the time validity periods is to periodically provide the HTTP manifest player with an updated manifest URL and instruct the player to switch over to the new URL at a certain time and then resume playing at a certain point in time in that new URL. Certain players support such functionality through either Javascript®, Flash® ActionScript or similar scripting layer. This permits shortening the validity period provided that a refreshed URL is provided to the player before the expiration of the prior validity period. For example, process 200 can use validity periods of one minute and refresh URLs every 30 seconds.

HTTP manifest formats typically specify support for HTTP session state cookies. For example, section 11 of the HLS specification explicitly mandates that "HTTP requests often include session state ("cookies"), which may contain private user data. Implementations must follow cookie restriction and expiry rules."

To insure that each cryptographically signed URL in the step of providing (210) can be used with one and only one browser, process 200 can have the proxy tie that URL (and all its derivatives present in the substituted data generated during the step of substituting (260)) to a particular cookie. One way to do this is, prior to the step of providing (210), generate a unique cookie in the browser hosting the player (or in the player itself if its a player not hosted in a browser, e.g., on a phone device), and include within the cryptographically signed URL information verifying the cookie, such as a secure hash. (We do not want to include the cookie itself, for that would provide the needed cookie to an unauthorized recipient in the URL itself.) The cookie can be any unique secret, such as a random number from a reasonably large range, a random UUID, and so forth. The proxy can then include validating the cookie in its validity checks.

It is not always possible to set a cookie before the step of providing (210). For example, not all non-browser hosted HTTP manifest video players will permit such. A standalone player on a phone may be restricted to receiving the cryptographically signed URL only, without the facility for manipulation of cookies prior to the step of providing (210). In this variation, the cryptographic URL in the step of providing (210) must at least include a unique identifier within its signed payload. This identifier may be randomly generated from a reasonably large range, may be a universally unique identifier UUID, and so forth.

The proxy in the step of verifying (240) the validity of the signed URL then checks to see if the identifier has been seen before. If it has, it validates that the request includes an appropriate cookie. If it hasn't been seen before, then in the step of substituting (260), as part of returning the manifest, the proxy returns a Set-Cookie request with a cookie that is cryptographically derived from the identifier in a manner that is secure against others apart from the proxy being able to derive the same cookie (e.g., by using a digital signature of the identifier as the cookie).

In this manner, each cryptographically signed URL in the step of providing (210) can be used by one and only one player instances as the proxy will provide the cryptographically derived cookie only once.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   in a network comprising at least a server and a manifest format player, providing a cryptographically signed manifest Uniform Resource Locator (URL) for the Hypertext Transfer Protocol (HTTP) manifest format player to play, the signed URL including at least a validity time span and an identification of a video;
   in the manifest format player, loading the manifest URL, the manifest URL pointing to an instantiation of a proxy;
   in the proxy, receiving the manifest URL and verifying the validity of the signed URL;
   in the proxy, retrieving the manifest indicated by the manifest URL, the manifest comprising entries;
   in the proxy, substituting each relevant entry in the manifest URL contents with signed URLs either to an underlying video segment or back to an instantiation of the proxy if the entry were another manifest;
   in the HTTP manifest player, processing the manifest altered with signed URLs as a standard manifest, playing the content.

2. The method of claim 1 wherein the signed URL uses a Digital Signature Algorithm (DSA).

3. The method of claim 1 wherein the signed URL uses a Rivest-Shamir-Adleman (RSA) algorithm.

4. The method of claim 1 wherein the signed URL uses a hash message authentication code (HMAC).

5. The method of claim 1 wherein a manifest format is HTTP Live Streaming (HLS).

6. The method of claim 1 wherein manifest altered with signed URLs comprises different time validities from the URL used to access the manifest from the proxy.

7. The method of claim 1 wherein the HTTP manifest format player is instructed to switch to a new signed URL at certain times.

8. The method of claim 1 wherein the initial cryptographically signed URL is securely tied to a secret cookie.

9. The method of claim 1 wherein the initially cryptographically signed URL includes a unique identifier and the proxy uses the unique identifier to implant a cryptographically derived cookie once.

* * * * *